United States Patent [19]
Kamimura

[11] Patent Number: 4,750,660
[45] Date of Patent: Jun. 14, 1988

[54] SHEET GUIDE POSITIONING APPARATUS

[75] Inventor: Tadao Kamimura, Tokyo, Japan

[73] Assignee: Isowa Industry Co., Ltd., Nagoya, Japan

[21] Appl. No.: 892,815

[22] Filed: Aug. 4, 1986

[30] Foreign Application Priority Data

Aug. 5, 1985 [JP] Japan .................. 60-119992[U]

[51] Int. Cl.⁴ ......................................... B65H 23/035
[52] U.S. Cl. ..................................... 226/199; 242/76; 271/240; 226/196
[58] Field of Search ............... 226/199, 196, 198; 242/76; 271/171, 253, 254, 255, 240, 236, 238; 198/836; 83/449, 499, 504, 507

[56] References Cited

U.S. PATENT DOCUMENTS

| | | | |
|---|---|---|---|
| 2,622,655 | 12/1952 | Todd | 242/76 |
| 3,269,627 | 8/1966 | O'Brien | 271/240 X |
| 4,657,239 | 4/1987 | Ikesue et al. | 271/255 X |
| 4,667,809 | 5/1987 | Raybuck | 271/240 X |

FOREIGN PATENT DOCUMENTS 1033972 6/1966 United Kingdom .

Primary Examiner—Stuart S. Levy
Assistant Examiner—Steven M. duBois
Attorney, Agent, or Firm—Cushman, Darby & Cushman

[57] ABSTRACT

An apparatus for positioning a pair of sheet guides for guiding a conveyed sheet therebetween. A pair of operation cylinders moves the pair of sheet guides toward and away from each other so as to contact the sheet. A pair of preset blocks is supported onto a screw rod including portions having mutually opposite threads thereon so that they are engaged with the corresponding opposite threads so as to move toward or away from each other along the screw rod according to the direction in which the screw rod is rotated by a motor. Each preset block includes a radial engagement protrusion. A positioning cylinder is provided to each sheet guide. The positioning cylinder includes an actuated piston which is engaged with the radial engagement protrusion at its protruded position to position the corresponding sheet guide at the desired position.

11 Claims, 4 Drawing Sheets

SHEET GUIDE POSITIONING APPARATUS

BACKGROUND OF THE INVENTION

1. Field of the Invention

The present invention relates generally to a sheet guide positioning apparatus and more particularly to a sheet guide positioning apparatus which when the width of a corrugated cardboard sheet conveyed at high speeds is changed, is suitable for instantaneously changing the spacing between a pair of sheet guides which guides the sheet therebetween in accordance with the changed width of the cardboard.

2. Prior Art

Generally, in manufacturing a double-sided corrugated cardboard sheet, as shown in FIG. 4, single-sided corrugated cardboard sheets 1, 2 manufactured by single facers are temporally stored on overhead bridges 3, 4 in a zigzag manner, conveyed by conveyors on overhead bridges 3, 4 and fed to a preheater 8 on the side of a double facer 7 via vacuum brake devices 5, 6. Vacuum brake devices similar to the vacuum brake devices 5, 6 are disclosed in Examined Published Japanese Patent Application No. 56-32098. The vacuum brake devices 5, 6 disclosed in the application have vacuum chambers 9, 10 which suck the liner sides of single-sided cardboard sheets such as those shown in FIG. 4 toapply tension to them. When the widths of the single-sided corrugated cardboard sheets are changed, the widths of the vacuum chambers 9, 10 are arranged to be adjusted to correspond to the changed widths of the cardboard sheets. The vacuum brake devices 5, 6 have two pair of sheet guides 11, 12 which guide therebetween the cardboard sheets 1, 2, respectively. The spacing between each pair of sheet guides 11 or 12 is adapted to be changed in conjunction with adjustment of the width of the corresponding vacuum chambers 9 or 10. The mechanism which adjusts the spacing between each pair of sheet guides 11 or 12 includes a screw rod consisting of half portions having mutually opposite threads thereon. The sheet guides 11 or 12 of each pair are screwed onto the corresponding opposite threads so that when the screw rod is rotated, the spacing between the sheet guides is adjusted so as to correspond to the width of the corresponding sheet 1 or 2. Because of this, the spacing between each pair of sheet guides 11 or 12 can not be adjusted instantaneously from one value to another corresponding to the next different width of the sheet. Especially, in order to adjust the guide spacing from its maximum to its minimum and vice versa, much time is required. Recently, the single-sided cardboard sheets 1,2 will be conveyed at high speeds especially in order to improve the manufacturing efficiency per hour. Thus, since a certain time is required to adjust the spacing between the sheet guides 11 or 12, and when the next portions of the cardboards 1, 2 have greater widths than the preceeding portions, adjustment of the spacing between each pair of the guides 11, 12 must be started before the leading edge of the different width portion of the corresponding cardboard 11 or 12 arrives at the corresponding sheet guides 11 or 12, and when the adjustment has been completed, the leading edge of the different width portion of the cardboard sheets 1 or 2 must arrive at the corresponding sheet guides 11 or 12. Otherwise, the leading edge of the different width portion of the cardboard sheet 1 or 2 would be hit against and damaged by the corresponding sheet guides 11 or 12. As a result, when the spacing between each pair of sheet guides 11 or 12 is adjusted, the corresponding cardboard sheet 1 or 2 is not guided properly at all. As a result the sheet 1 or 2 may be conveyed unsteadily out of position. Thus, in bonding the single-sided cardboard sheets 1 and 2 and then a liner sheet 13 to them, the cardboard sheets 1, 2 and the liner are displaced one from the other, thereby resulting in a bad product in which the cardboard sheets and liner are uneven in edge. In addition, it is not easy to take the timing of adjusting the sheet guide spacing to the next different width portion of the sheet.

In order to eliminate these problems, applicant has proposed a single-sided corrugated cardboard sheet guide apparatus, which is disclosed in Examined Published Japanese Utility Model Application No. 57-29320.

This apparatus has a pair of upper and lower sheet guide mechanisms, each including a pair of sheet guides which guides therebetween a single-sided corrugated cardboard sheet. While one pair of sheet guides is guiding therebetween a single-sided corrugated cardboard sheet, the other pair of sheet guides is adjusted in advance so as to correspond to the next different width portion of the cardboard sheet produced according to different order. When the different width portion of the cardboard sheet arrives at the one pair of sheet guides, guiding is switched instantaneously from the one of pair of sheet guides to the other pair, using air cylinder means. Since, in this apparatus, switching is instantaneously performed from one pair of sheet guides to another pair when the width of the corresponding single-sided corrugated cardboard sheet is changed, the sheet can be guided continuously, but a pair of upper and lower sheet guide mechanisms is needed. Thus, although this apparatus has a simple structure, the entire apparatus becomes large-scaled, occupies a large space and becomes large-sized.

SUMMARY OF THE INVENTION

Therefore, in view of the above problems, it is an object of the present invention to provide a sheet guide positioning apparatus which when the width of a sheet is changed, can instantaneously adjust the spacing between a pair of sheet guides which guides the sheet therebetween, is compact and can be incorporated easily into the sheet carrier mechanism.

In order to attain the above object, the sheet guide positioning apparatus according to the present invention comprises sheet guide means applied to a sheet conveyed for guiding same, drive cylinder means with a locking mechanism and provided to the sheet guide means for moving the sheet guide means transversely of the sheet, motor driven screw rod means, preset block means screwed onto the screw rod means such that when the screw rod means is rotated, the preset block means may be moved along the screw rod means, the preset block means having positioning engagement means, the positioning cylinder means provided to the sheet guide means and having engagement means operable to be engaged with and disengaged from the positioning engagement means.

DETAILED DESCRIPTION OF A PREFERRED EMBODIMENT

Now, one preferred embodiment of a sheet guide positioning apparatus according to the present invention will be described in more detail with respect to the accompanying drawings.

Figure 1:
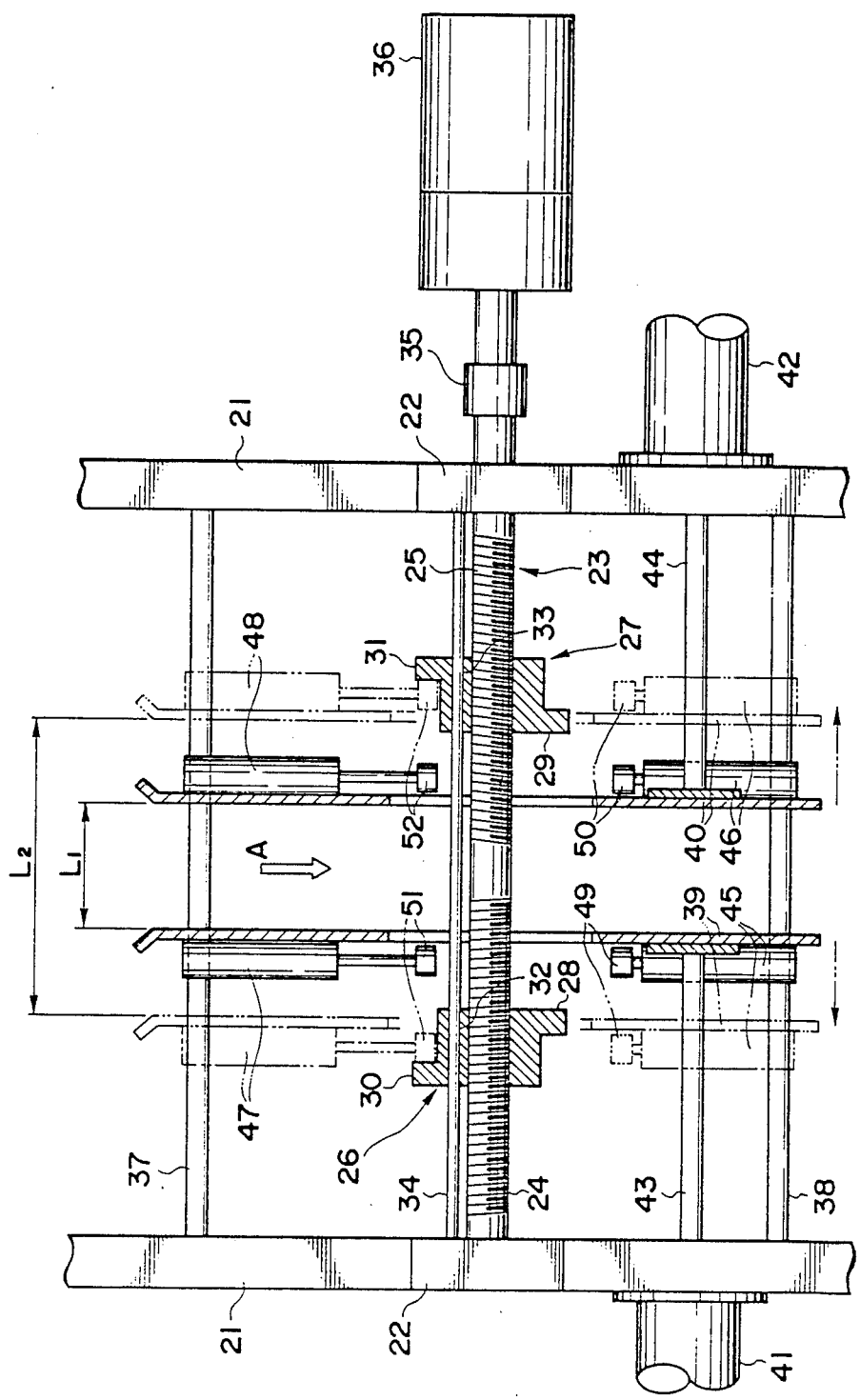
FIG. 1 is a plan view partially in cross section of an embodiment of a sheet guide positioning apparatus according to the present invention, showing that the spacing between the sheet guides is going to be adjusted in the direction of expansion.
Figure 2:
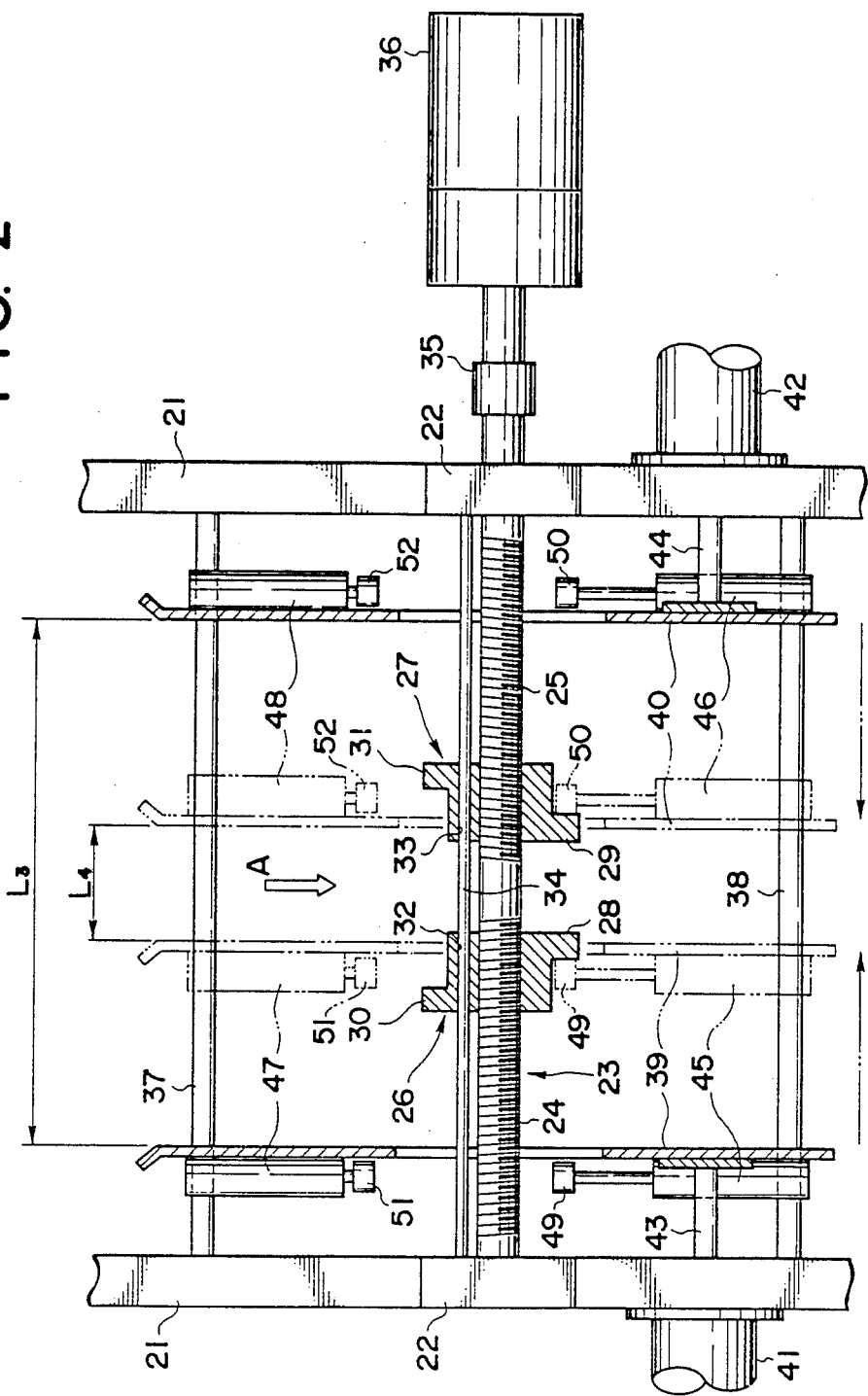
FIG. 2 is a view similar to FIG. 1, showing that the spacing between the sheet guides is going to be adjusted in the direction of retraction.
Figure 4:
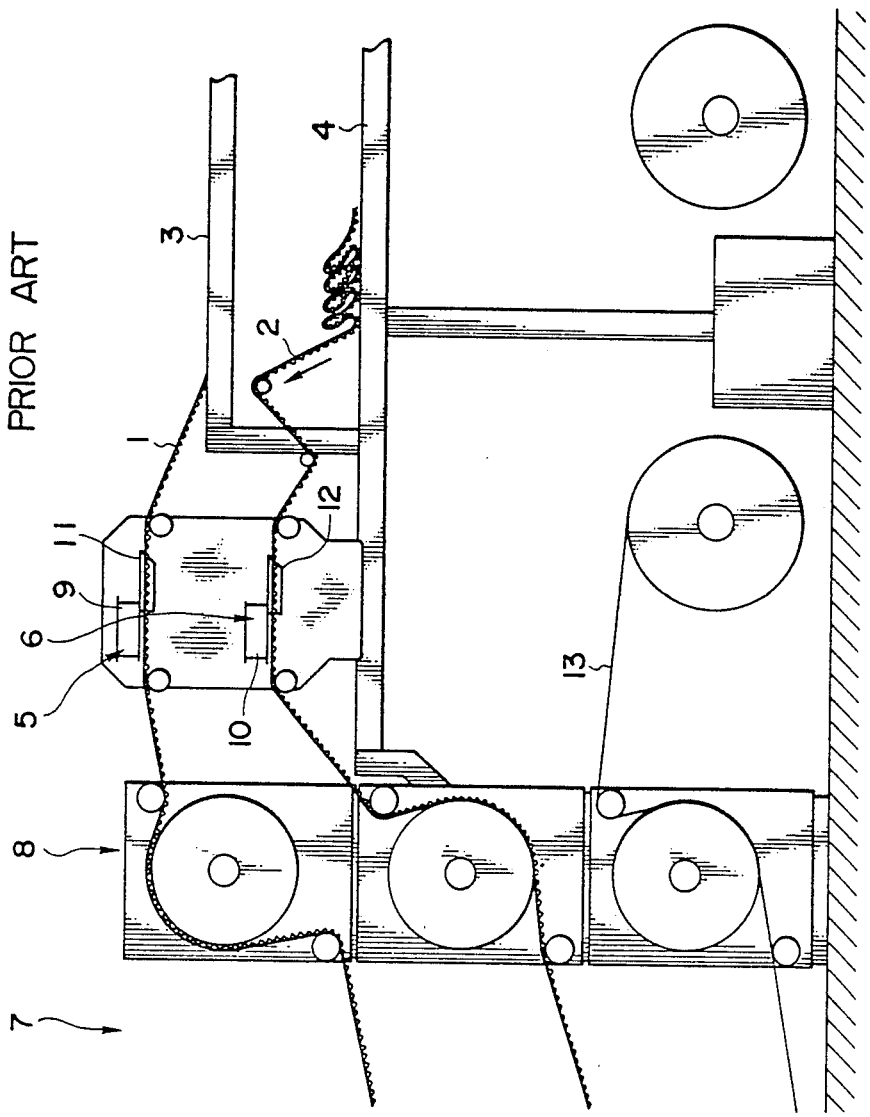
FIG. 4 is a side view of the essential portion of a conventional mechanism which feeds a sheet to the double facer through the vacuum brake devices from the single facers.

In FIGS. 1 and 2, reference numeral 21 identifies a pair of frames and reference numeral 22 identifies a bearing provided in each frame 21. A screw rod 23 is pivotably journaled by the bearings 22. The screw rod 23 consists of right and left halves, the left half having a right-hand thread 24 thereon and the right half having a left-hand thread 25 thereon, respectively; namely, the screw rod has mutually opposite threads thereon. A pair of preset blocks 26, 27 are screwed onto the right-hand and left-hand threads 24 and 25, respectively, so that they can move along the screw rod toward or away from each other according to the direction in which the screw rod is rotated. The preset blocks 26, 27 have inward engagement portions 28, 29 and outward engagement portions 30, 31, respectively, for use in positioning. The preset blocks 26, 27 have guide holes 32, 33 through which is inserted a guide rod 34 extending between the frames 21 so that the preset blocks can move freely along the guide rod 34. The screw rod 23 is coupled at one end through a coupling 35 to a motor 36. The motor 36 may have reduction gears which are coupled to the screw rod 23. A pair of guide rods 37, 38 extends between the frames 21 and supports a pair of left and right sheet guides 39, 40 such that the sheet guides can move freely along the guide rods 37, 38. For supporting purposes, various types of support means may be employed. For example, the sheet guides 39, 40 can be supported by the guide rods 37, 38 through corresponding brackets, or the sheet guided 39, 40 may be supported by guide rods 37, 38 extending through holes provided in the sheet guides 39, 40 so that the sheet guides can move freely along the guide rods, as shown FIGS. 1 and 2. Drive air cylinders 41, 42 have piston rods 43, 44 fixed to the sheet guides 39, 40, respectively. The drive air cylinders 41, 42 are fixed to the corresponding frames 21 and can hold the operated positions of the piston rods 43, 44, respectively, by their locking mechanisms. Each locking mechanism may be of the type which holds the piston position of the corresponding cylinders 41 or 42 by supplying air from two air exits to the corresponding piston. The locking mechanism may be of the type which locks the piston rods 43, 44 electromagnetically, or other conventional types of locking mechanism may be used. The sheet guides 39, 40 have inward enagement air cylinders 45, 46 and outward engagement air cylinders 47, 48, respectively, fixed thereto for positioning purposes. The piston rods of the inward engagement air cylinder 45, 46 have at their leading ends engagement portions 49, 50 which can be engaged with the inward engagement portions 28, 29 of the preset blocks 26, 27, respectively. The piston rods of the outward engagement air cylinders 47, 48 have at their leading ends engagement portions 51, 52 which can be engaged with outward engagement portions 30, 31 of the preset blocks 26, 27, respectively. Electromagnetically driven plungers may be substituted for the inward and outward engagement air cylinders 45, 46 and 47, 48. The drive air cylinders 41, 42, the inward engagement air cylinders 45, 46 and the outward engagement air cylinders 47, 48 are controlled by a controller, not shown, such that they are operated in conjunction with brake devices such as the brake devices 5, 6 shown in FIG. 4. The motor 36 is also controlled by the controller.

Next, the apparatus which positions the sheet guides 39, 40 will be described.

Assume that a single-sided corrugated cardboard sheet is conveyed in the direction of the arrow A in FIGS. 1 and 2. As shown in FIG. 1, when the width of the single-sided corrugated cardboard sheet is to be changed from a width $L_1$ to a larger width $L_2$, the preset blocks 26, 27 are in advance moved by driving the motor 36 to their positions where the spacing between the blocks 26 and 27 correspond to the sheet width $L_2$. When the leading edge of the sheet portion having the width $L_2$ arrives almost at the end of the sheet guides 39, 40, the outward engagement air cylinders 47, 48 are actuated to extrude their engagement portions 51, 52 therefrom. The locking mechanisms are unlocked and then the drive air cylinders 41, 42 are operated to move the sheet guides 39, 40 along the guide rods 37, 38 away from each other until the spacing between the sheet guides 39 and 40 equals $L_2$ whereupon the engagement portions 51, 52 of the outward engagement air cylinders 47, 48 are engaged with the outward engagement portions 30, 31 of the preset blocks 26, 27, respectively. The locking mechanisms for drive air cylinders 41, 42 are then actuated so that the piston rods 43, 44 and hence the sheet guides 39, 40 hold their positions. The outward engagement air cylinders 47, 48 are then actuated to disengage the engagement portions 51, 52 out of the outward engagement portions 30, 31 in order to permit the preset blocks 26, 27 to move in preparation for arrival of the next possible different width portion of the single-sided cardboard sheet. The sheet guides 39, 40 move instantaneously from their positions, the spacing between which is $L_1$, to their other positions, the spacing between which is $L_2$, so that the cardboard sheet is guided continuously in spite of change of the sheet width.

Now, assume that the width of the single-sided cardboard sheet is changed from $L_3$ to $L_4$, as shown in FIG. 2. Before the leading edge of the different width $L_4$ portion arrives at the ends of the sheet guides 39, 40, the motor 36 is actuated in advance to move the preset blocks 26, 27 from their positions which have resulted in the spacing $L_3$ to their other positions which will result in the shorter spacing $L_4$. When the different width portion of the sheet arrives at the inlet ends of sheet guides 39, 40, the inward engagement air cylinders 45, 46 are actuated to extrude the engagement portions 49, 50 out of the inward engagement air cylinders 45, 46 and the locking mechanisms for the drive air cylinders 41, 42 are unlocked to move the sheet guides 39, 40 toward each other. At this time, the engagement portions 49, 50 of the inward engagement air cylinders 45, 46 are engaged with the inward engagement portions 28, 29 of the preset blocks 26, 27, respectively, to stop the sheet guides 39, 40 at their positions where the spacing of $L_4$ is formed. The locking mechanisms for the drive air cylinders 41, 42 are then actuated to fix the piston rods 43, 44 and hence to hold sheet guides 39, 40 at their positions. The inward engagement air cylinders 45, 46 are then actuated to disengage the engagement portions 49, 50 out of the inward engagement portions 28, 29, respectively, to permit the preset blocks 26, 27 to move in preparation for arrival of the next possible different width portion of the sheet.

Figure 3:
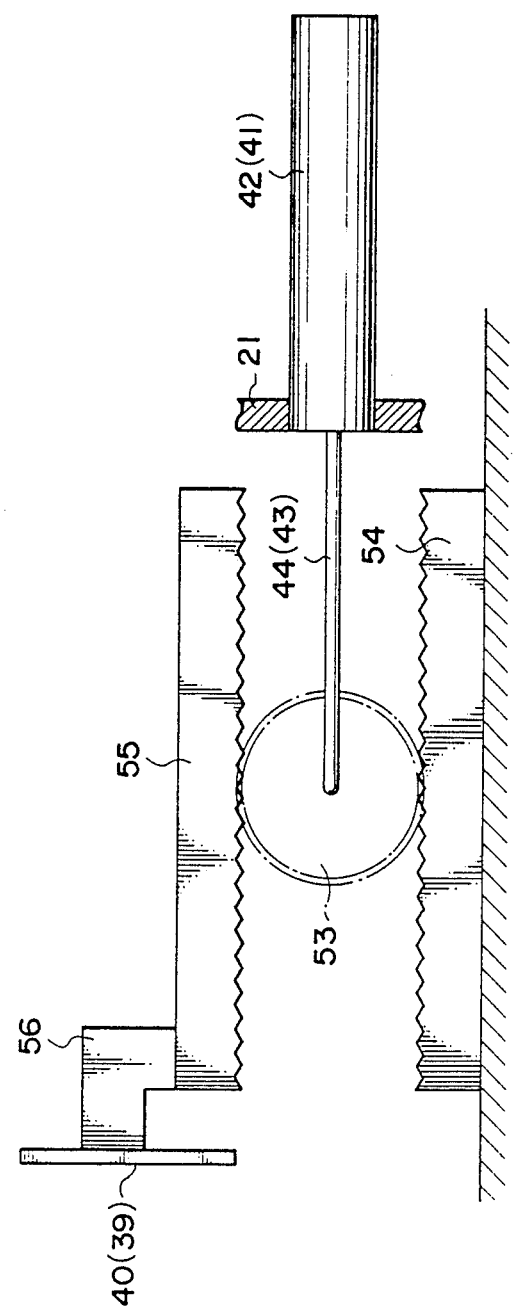
FIG. 3 is an elevational view showing the essential portions of another embodiment of the positioning apparatus.

FIG. 3 shows another embodiment which can increase the effective lengths of the operation strokes of the drive air cylinders 41, 42 when the actual operation strokes of the drive air cylinders 41, 42 are insufficient to adjust the spacing between the sheet guides 39 and 40 from its narrowest one to its widest one. The piston rods 43, 44 of the drive air cylinders 41, 42 each have a pinion 53 pivoted thereon which is in turn meshed between racks 54 and 55. The rack 54 is fixed to the frame 21 while the rack 55 is supported by the frame 21 so as to move rectilinearly. Each of the sheet guides 39, 40 is fixed directly or through a bracket 56 to the rack 55. If the drive air cylinders 41, 42 are actuated so that the spacing between the sheet guides 39, 40 corresponds to the width of a single-sided corrugated cardboard sheet, the pinion 53 rolls on the rack 54 while being engaged with the racks 54, 55. Thus, the rack 55 moves twice the operation stroke of each of the piston rods 43, 44. Of course, in exactly the same way as the sheet guides of the above embodiment, the sheet guides 39, 40 are positioned by engagement of the engagement portions 49, 50 of the inward engagement air cylinders 45, 46 with the inward engagement portions 28, 29 of the preset blocks 26, 27, or by engagement of the engagement portions 51, 52 of the outward engagement air cylinders 47, 48 with the outward engagement portions 30, 31 of the preset blocks 26, 27, respectively.

It should be noted that driving of the motor 36 will be easily controlled if the inward engagement portions 28, 29 and the outward engagement portions 30, 31 are provided such that there is no discrepancy between the positions where the sheet guides 39, 40 are set by engagement of the inward engagement portions 28, 29 of the preset blocks 26, 27 with the engagement portions 49, 50 of the inward engagement air cylinders 45, 46 and the same desired positions where the sheet guides 39, 40 are set by engagement of the engagement portions 51, 52 of the outward engagement air cylinders 47, 48 with the outward engagement portions 30, 31. While the preset blocks 26, 27 are shown as having the inward engagement portions 28, 29 and the outward engagement portions 30, 31, respectively, a structure may be employed alternatively which includes a pair of preset blocks having inward engagement portions such as 28, 29 respectively, the preset blocks being screwed onto the screw rod such that the preset blocks 26, 27 are engaged with the right-hand and left-hand threads, respectively, on the screw rod so as to move toward or away from each other according to the direction in which the screw rod is rotated, and a second pair of preset blocks having outward engagement portions such as 30, 31, respectively, the second pair of the preset blocks being screwed onto a second screw rod which has right-hand and left-hand threads thereon such that the preset blocks are engaged with the right-hand and left-hand threads, respectively, on the screw rod so as to move toward or away from the each other according to the direction in which the second screw rod is rotated, in order to attain the same purpose. Also, while the preset blocks 26, 27 have guide holes 32, 33 through which the guide rod 34 is inserted so that the guide rod 34 guides the movement of the preset blocks 26, 27, other types of guide means may be used instead. For example, a structure may be employed which includes a guide rod having an elongated groove therein extending along its length, and preset blocks 26, 27 having protrusions received slidably in the groove. Of course the sheet guides 39, 40 will normally move by the same distance relative to the center of the spacing between the sheet guides 39, 40.

The sheet guide positioning apparatus according to the present invention can be used in conjunction with vacuum brake devices such as 5, 6 operating when single-sided corrugated cardboard sheets are fed to the double facer, and can be applied to a paste width guide of a pasting machine used when various corrugated cardboard sheets are manufactured, or to other various machines.

As described above, the sheet guide positioning apparatus according to the present invention, the preset blocks are in advance adjusted so as to correspond to the different width of the next incoming portion of the sheet. When the different width portion of the sheet arrives almost at the sheet guides, the drive cylinders move the sheet guides until the positioning cylinders engage the positioning engagement portions of the preset blocks to adjust the width between the sheet guides instantaneously. Thus, although the sheet width is changed, the sheet guides can guide the sheet continuously. Therefore, the problem is solved that while the spacing between the sheet guides is being adjusted, the different width portion of the sheet may otherwise collide against the sheet guides and the sheet may be damaged. In addition, advantageously, the apparatus has a compact structure and can be incorporated easily into the sheet conveyor mechanism.

What is claimed is:

1. As sheet guide positioning apparatus comprising:
   sheet guide means applied to a sheet conveyed for guiding same;
   drive cylinder means with a locking mechanism for moving said sheet guide means transversely of the sheet, said locking mechanism being positioned in said drive cylinder means to maintain the sheet guide at a suspended position;
   motor driven screw rod means;
   preset block means screwed onto said screw rod means such that when said screw rod means is rotated, said preset block means may be moved along said screw rod means, said preset block means being provided with an inward positioning engagement portion and an outward positioning engagement portion; and
   engagement cylinder means on said sheet guide means for engaging and disengaging and end engagement portion thereof with said preset block means, said end engagement portion being connected to said engagement cylinder means via a piston rod, wherein the position of said sheet guide means may be precisely adjusted.

2. An apparatus for positioning a pair of sheet guide means for guiding therebetween a conveyed sheet in sliding relationship to said sheet, comprising:
   means connected to said pair of sheet guides means for moving said pair of sheet guide means toward and away from each other so as to contact the sheet;

rotatable screw rod means including portions having mutually opposite threads thereon;

a pair of preset block means screwed onto said screw rod means such that said preset blocks are engaged with the corresponding opposite threads so as to move toward or away from each other along said screw rod means according to the direction in which said screw rod means is rotated, each said preset block means including at least a first positioning engagement portion; and means provided on each sheet guide means for positioning same at a desired position, said positioning means including engagement means engageable with and disengageable from said first positioning engagement portion on each preset block member.

3. An apparatus according to claim 2, wherein said sheet guide moving means includes an operating cylinder having an actuated piston.

4. An apparatus according to claim 3, further including means for increasing the effective stroke of said piston.

5. An apparatus according to claim 4, wherein said increasing means includes a pinion pivoted to said piston, a fixed rack and a movable rack for holding said pinion therebetween in meshing relationship to same.

6. An apparatus according to claim 2, wherein said first positioning engagement portion includes a radial protrusion on said block means and said positioning means includes an actuating cylinder having a reciprocal piston with a head which is engageable with and disengageable from said radial protrusion.

7. An apparatus according to claim 6, wherein said radial protrusion and said piston head cooperate with each other to prevent expansion of the spacing between said pair of sheet guides beyond a desired spacing.

8. An apparatus according to claim 6, wherein said radial protrusion and said piston head cooperate with each other to prevent reduction of the spacing between said pair of sheet guides below a desired value.

9. An apparatus according to claim 2, wherein said pair of preset block means includes means for preventing said pair of preset block means from being rotated when said screw rod means is rotated.

10. An apparatus according to claim 9, wherein said preventing means includes a guide rod passing through said pair of preset block means so that said pair of block means can move along said screw rod means without rotation.

11. Apparatus for relatively positioning a pair of sheet guide members for engaging a sheet-like workpiece passing therebetween comprising:

means for moving said sheet guide members toward and away from each other to adjust the spacing therebetween;

a pair of movable block members, each of said block members having at least one engaging portion;

means for moving said block members toward and away from each other so as to adjust the spacing between said respective engaging portions; and means on said guide members for selectively engaging said engaging portions on said block members, respectively, whereby said guide members may be precisely repositioned by moving said block members to a predetermined position, and subsequently moving said sheet guide members until said engaging means contacts said engaging portion.

* * * * *